US012719924B2

(12) United States Patent
Ballew et al.

(10) Patent No.: US 12,719,924 B2
(45) Date of Patent: Aug. 25, 2026

(54) SYSTEMS AND METHODS FOR MITIGATING DENIAL OF SERVICE ATTACKS

(71) Applicant: CenturyLink Intellectual Property LLC, Broomfield, CO (US)

(72) Inventors: Dean Ballew, Sterling, VA (US); John R.B. Woodworth, Amissville, VA (US)

(73) Assignee: CenturyLink Intellectual Property LLC, Denver, CO (US)

( * ) Notice: Subject to any disclaimer, the term of this patent is extended or adjusted under 35 U.S.C. 154(b) by 363 days.

(21) Appl. No.: 18/306,795

(22) Filed: Apr. 25, 2023

(65) Prior Publication Data

US 2023/0362192 A1 Nov. 9, 2023

Related U.S. Application Data

(60) Provisional application No. 63/339,736, filed on May 9, 2022.

(51) Int. Cl.

*H04L 9/40* (2022.01)
*H04L 45/00* (2022.01)
*H04L 45/44* (2022.01)

(52) U.S. Cl.

CPC .......... *H04L 63/1458* (2013.01); *H04L 45/44* (2013.01); *H04L 45/54* (2013.01); *H04L 45/72* (2013.01); *H04L 63/1416* (2013.01); *H04L 63/1425* (2013.01)

(58) Field of Classification Search

CPC ..... H04L 63/1458; H04L 45/44; H04L 45/54; H04L 45/72; H04L 63/1416; H04L 63/1425

See application file for complete search history.

(56) References Cited

U.S. PATENT DOCUMENTS 7,525,921 B1 * 4/2009 Yi Dar Lo .......... H04L 63/1458 370/422
7,898,966 B1 * 3/2011 Yi Dar Lo .............. H04L 45/02 370/422
8,571,029 B1 * 10/2013 Aggarwal ............... H04L 45/50 370/256
2002/0083175 A1 * 6/2002 Afek .................. H04L 63/1458 709/239

(Continued)

OTHER PUBLICATIONS

International Search Report and Written Opinion of the International Searching Authority, dated Jul. 20, 2023, Int'l Appl. No. PCT/US2023/066204, Int'l Filing Date Apr. 25, 2023; 15 pgs.

*Primary Examiner* — Techane Gergiso

(57) ABSTRACT

Examples of the present disclosure are directed to systems and methods for using router identifier information to mitigate denial of service attacks in an autonomous system (AS). Each router of the AS may be assigned a router identifier (ID) that is unique to the AS and may be periodically changed. The ingress router first receiving the packet within a particular AS may insert its router ID into the packet. A threat intelligence system may sample packets of traffic received by the AS and examine the inserted ingress router IDs in making a threat determination. If a distribution of detected ingress router IDs from sampled packets does not match an expected distribution of ingress router IDs, one or more threat mitigation actions may be invoked.

16 Claims, 6 Drawing Sheets

(56) References Cited

U.S. PATENT DOCUMENTS

2002/0131362 A1* 9/2002 Callon .................... H04L 45/02 370/227
2004/0093521 A1* 5/2004 Hamadeh ............ H04L 63/0236 726/22
2005/0044208 A1* 2/2005 Jones .................. H04L 63/1408 709/224
2005/0111367 A1* 5/2005 Jonathan Chao ... H04L 63/1408 370/235
2005/0278779 A1* 12/2005 Koppol ............... H04L 63/1458 726/22
2006/0010389 A1* 1/2006 Rooney ............... H04L 63/1458 715/736
2006/0182034 A1* 8/2006 Klinker ................... H04L 45/04 370/248
2007/0206605 A1* 9/2007 Ansari .................... H04L 45/00 370/395.5
2008/0028467 A1* 1/2008 Kommareddy ..... H04L 63/1458 726/23
2008/0062891 A1* 3/2008 Van der Merwe ...... H04L 45/42 370/254
2008/0271146 A1 10/2008 Rooney
2011/0271340 A1 11/2011 Vaidyanathan
2014/0245435 A1 8/2014 Belenky
2015/0244615 A1* 8/2015 Esale .................... H04L 45/507 370/389
2017/0272465 A1 9/2017 Steele
2018/0287905 A1* 10/2018 Mehta ................. H04L 47/2441
2019/0104151 A1* 4/2019 Cheng ................. H04L 63/1425
2022/0174019 A1* 6/2022 Liang ...................... H04L 45/38

* cited by examiner

SYSTEMS AND METHODS FOR MITIGATING DENIAL OF SERVICE ATTACKS

CROSS-REFERENCE TO RELATED APPLICATIONS

This application claims the benefit of U.S. Provisional Application No. 63/339,736 filed 9 May 2022, entitled "Systems and Methods for Mitigating Denial of Services Attacks," which is incorporated herein by reference in its entirety.

FIELD

One or more aspects according to the present disclosure relate to denial of service attacks in a communication network, and more particularly, to using router identifiers to mitigate distributed denial of service attacks.

BACKGROUND

Communications networks have increased in complexity. For example, large communication networks may process millions of queries (or more) per second. Malicious actors routinely attempt to circumvent security measures of communications networks and/or cause communications network failures. For example, denial of service (DoS) and distributed denial of service (DDoS) attacks have become commonplace. DDoS attacks attempt to overwhelm network components (such as domain name system (DNS) servers) or applications by flooding the network components or applications with superfluous requests in an attempt to overload the network, network components, or applications and prevent legitimate requests from being fulfilled. In a DDoS attack, the incoming traffic that floods the victim's network components or applications may originate from different sources. In this scenario, simply blocking a single source may not stop the attack.

Identification and mitigation of DDoS attacks may be more difficult for connectionless protocols such as the User Datagram Protocol (UDP), which is used by domain name servers (DNS), and a QUIC UDP Internet Connections protocol (or a transport layer protocol of Hypertext Transport Protocol (HTTP) 3.0).

The above information disclosed in this Background section is only for enhancement of understanding of the background of the present disclosure, and therefore, it may contain information that does not form prior art.

SUMMARY

An example of the present disclosure is directed to a method that includes receiving traffic information for a first autonomous system, wherein the traffic information includes: router identifier information identifying at least one ingress router receiving traffic at the first autonomous system; and identification of a source of the traffic. In examples, the method also includes determining whether the router identifier information matches expected ingress router information for the source of the traffic. In examples, the method further includes causing, based at least in part on determining that the router identifier information does not match the expected ingress router information for the source of the traffic, a threat mitigation action to be invoked.

In other aspects, the present disclosure is directed to a system comprising at least one processor and memory, operatively connected to the at least one processor and storing instructions that, when executed by the at least one processor, cause the system to perform a method, the method comprising receiving traffic information for a first autonomous system, wherein the traffic information includes: router identifier information identifying at least one ingress router receiving traffic at the first autonomous system; and identification of a source of the traffic. In examples, the method also includes determining whether the router identifier information matches expected ingress router information for the source of the traffic. In examples, the method further includes causing, based at least in part on determining that the router identifier information does not match the expected ingress router information for the source of the traffic, a threat mitigation action to be invoked.

In other aspects, the present disclosure is directed to a method that includes receiving traffic information for a first autonomous system, wherein the traffic information includes: router identifier information identifying at least one ingress router receiving traffic at the first autonomous system; and identification of a source of the traffic. In examples, the method also includes determining whether the router identifier information matches expected ingress router information for the source of the traffic by: extracting the router identifier information from a plurality of sampled packets received by the first autonomous system; determining, from the router identifier information, a distribution of ingress routers for the traffic during a period of time; and determining an expected distribution of ingress routers during the period of time based on historical data. In examples, the method also includes causing, based at least in part on determining that the router identifier information does not match the expected ingress router information for the source of the traffic, a threat mitigation action to be invoked.

These and other features, aspects and advantages of the examples of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive examples of the present embodiments are described with reference to the following figures, wherein like reference numerals refer to like parts throughout the various views unless otherwise specified.

DETAILED DESCRIPTION

Figure 1:
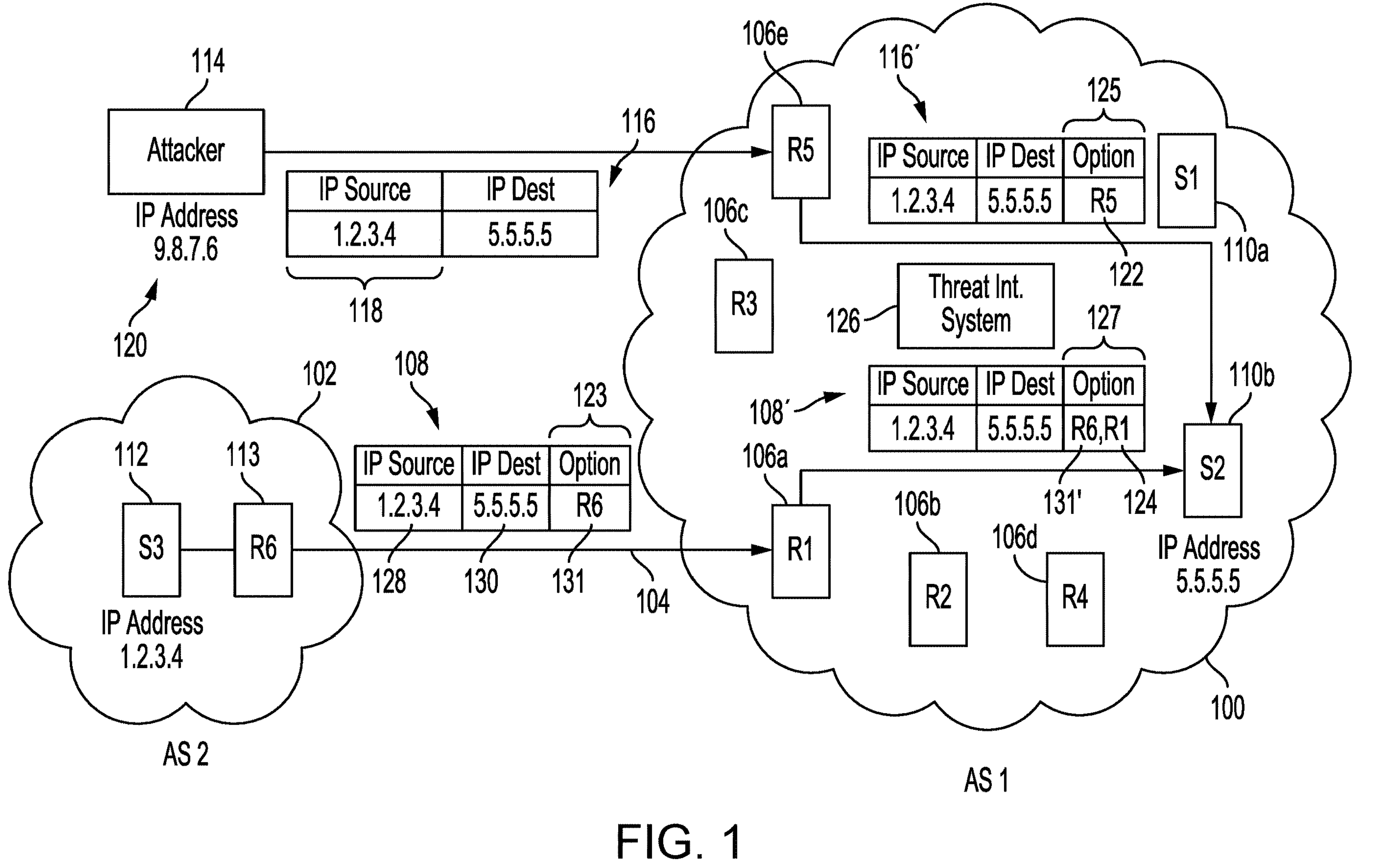
FIG. 1 is a block diagram of an example networking environment for mitigating DoS attacks according to examples.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

DoS and DDoS attacks (collectively referred to herein as DoS attacks) that attempt to overwhelm an organization's network components (such as domain name system (DNS) servers, web or content servers, and the like) have become commonplace. When a DDoS attack is launched, a number of attacking machines may send, to a target service, a high volume of requests or specially crafted requests for service that may, if suitable measures are not taken, overwhelm the target service and degrade its ability to service legitimate requests. As used herein, a service may comprise a computing device or collection of computing devices that perform a computing service, such as (and without limitation) domain name services, content delivery services, web site hosting services, or the like. In a DDoS attack, the attacking machines may spoof multiple IP addresses at the same time to mask the attacker's location, making it difficult to mitigate the attack.

In general terms, examples of the present disclosure are directed to systems and methods for using router identifier information (such as specific router identifiers (IDs)) to mitigate DoS attacks of network resources in an autonomous system (AS). The AS may include routers whose IP address prefixes and routing policies are under a common administrative control. In one example, each router of the AS is assigned a router identifier (ID) that may be different from either the router's IP address or media access control (MAC) address. At a minimum, the assigned router IDs may be unique to the routers within the same AS. In examples, the router ID may be assigned upon configuration of the router, and periodically reassigned upon detecting a criterion, such as expiration of the router ID.

In examples, the ingress router first receiving the packet within a particular AS (which will often be the router logically closest to a source transmitting a data packet) receives the packet and inserts its router ID into the packet. A threat intelligence system may receive traffic information for traffic received by the particular AS, wherein the traffic information includes both router identifier information (e.g., a router identifier), and an identification of the source of the traffic.

For example, the threat intelligence system may sample packets of traffic received by the AS and examine sampled packets and the inserted router IDs and source IP addresses of such packets in making a threat determination. As used herein, traffic comprises a plurality of electronic messages or portions of electronic messages (such as Internet protocol (IP) packets) transceived by one or more network or network system. In one example, the threat intelligence system randomly or periodically samples packets for determining trends, maintaining a threat measure, and/or making a statistical evaluation of the detected and expected ingress router IDs. For example, the threat intelligence system may randomly sample packets to identify the ingress routers (e.g., peering point/entry point) routers of the AS that receive packets purporting to be from a particular source IP address or source AS. In examples, the distribution of detected router IDs from sampled packets may not match an expected distribution of ingress router IDs, e.g., by a threshold deviation. For example, if a randomly sampled packet is transmitted by a peer AS (e.g., source AS), the packet is expected to be received by a particular ingress router, or one of a set of routers, associated with a peering point of the peer AS. If the source IP address has been spoofed by an attacker to appear as if the packet is coming from the peer AS, when in fact the packet is coming from outside the peer AS, the packet may be received by a router other than the expected ingress router(s) at the peering point(s). In this case, the distribution of router ID(s) in the packet may be different from the distribution of expected router ID of the router(s) at the peering point(s), and such information may be used by the threat intelligence system to determine whether a threat condition has been reached.

In one example, the threat intelligence system invokes a threat mitigation action in response to detecting threat. For example, the threat intelligence system may cause a threat mitigation system to scrub traffic suspected of being suspicious. In some examples, the entry point routers of the AS may be instructed to refuse packets from the spoofed source IP address and/or peering AS that resulted in a mismatch between expected and actual distribution of entry point router(s). Other threat mitigation actions may also be taken.

FIG. 1 is a block diagram of an example networking environment for mitigating DoS attacks according to one example. The networking environment may include any type of telecommunications network that utilizes IP addresses for connecting one or more components of the network.

In one example, the networking environment includes a first AS 100 and a second AS 102. The first AS 100 and the second AS 102 may exchange packets with one another over a link 104. Each AS 100, 102 may be under a separate administrative domain, such as a particular Internet Service Provider (ISP), a particular corporation, or some other organization. Each AS may be assigned one or more ranges of IP addresses which are then advertised to each other and to other autonomous systems and/or networks, such as the Internet, to allow packets that include the IP addresses to be directed to the corresponding destination AS. Each AS may further be assigned a unique AS number by a registry organization such as, for example, the American Registry for Internet Numbers.

In one example, the first AS 100 includes a plurality of routers 106*a*-106*e* (collectively referenced as 106) that share the same AS number. One or more of the routers may provide entry points (also referred to as ingress or peering points) into the first AS 100. For example, router R1 106*a* may be an ingress point for receiving packets 108 from the second AS 102, that are destined to one or more target servers 110*a*, 110*b* (collectively referenced as 110). In examples, router R1 106*a* may be specifically designated as an ingress router for packets from AS 102. In other examples, R1 may naturally act (due to routing protocols) as the ingress router for the majority of packets from AS 102 due to its geographic or logical proximity to router R6 113 in AS 102. In examples, R3 106*c* may also receive some traffic from AS 102 during normal operation (e.g., due to load management on router R1 106*a*). The target servers 110 may be configured to provide one or more target services. The one or more target services may include, for example, a domain name system (DNS) service, content delivery service, and/or the like. As used herein, ingress router refers to a first router to receive traffic within an AS.

The packets 108 transmitted from the second AS 102 to the first AS 100 may include a source address 128 and a destination address 130. For example, a packet transmitted by server S3 112 to server S2 110*b* may include, as the source address 128, the IP address of server S3 112, and further include, as the destination address 130, the IP address of server S2 110*b*. Packet 108 may also identify the packet as originating from AS 102. In other examples, the AS 100 may be able to determine from the source address 128 that the packet 108 originates (or purports to originate) from AS 102.

The ingress router (e.g., router R1 106*a*) in the first AS 100 may receive the packet from a router (e.g., router R6 113) in the second AS 102, determine the traffic's destination/target IP address (e.g., the IP address of server S2 110*b*), determine a route for the traffic within AS 100, and forward the packet to the target server S2 110*b* based on the determined route. The packet may traverse one or more of the other routers in the first AS 100 (e.g., router R2 106*b* and router R4 106*d*) prior to reaching the target (e.g., server 110*b*).

In some cases, an attacker 114 may send malicious requests directed to the first AS 100 in an attempt to overload network components or applications of the first AS 100 and prevent legitimate requests from being fulfilled. The malicious requests may take the form of a DoS attack that includes a high volume of requests or specially crafted requests for service aimed to overwhelm the first AS (or a particular service of the first AS 100, such as a service provided by server S2 110*b*). In one example, the malicious request may be transmitted in a malicious packet 116 that spoofs the IP source address 118 by inserting the IP address of server S3 112 instead of a real IP address 120 of the attacker 114. Thus, the malicious packet 116 appears to originate from the second AS 102 (e.g., because AS 100 associates the spoofed IP source address with AS 102).

Continuing the example, the malicious packet 116 is received by router R5 106*e* according to a route selected by a separate routing protocol or a route table maintained or utilized by attacker device 114. In response to receipt of the packet, router R5 106*e* inserts into the packet, a router ID that has been uniquely assigned to router R5 106*e*. As discussed further herein, the routers 106 in the first AS 100 are assigned router IDs that are unique to them, at least within the AS 100. One or more of the routers 106 (e.g., ingress routers R1 106*a*, R3 106*c*, and R5 106*e*) may be configured to insert their assigned routing ID upon receipt of the packet from outside of AS 100. For example, router R5 106*e* is configured to receive the malicious packet 116 and insert into the packet its router ID 122 (e.g., R5), and router R1 106*a* is configured to receive the packet 108 and insert into the packet its router ID 124 (e.g., R1). In some examples, one or more other intervening routers (e.g., R2 and R4) may also insert their respective router IDs along the route within AS 100.

In one example, the router ID is inserted into a preset field 123, 125, 127 of a header of the data packet 116, 108. The preset field may be, for example, an "options" field for an IPv4 data packet.

In some examples, a router in the second AS 102 (e.g., router R6 113) may insert its router ID 131 (e.g., R6) into the packet 108 prior to transmitting the packet to the first AS 100. The router in the first AS 100 receiving the packet (e.g., router R1 106*a*) may append its router ID 124 (e.g., R1) to the router ID 131' (e.g., R6) that already appears in the packet. In other examples, router in the first AS 100 receiving the packet (e.g., router R1 106*a*) may insert its router ID 124 (e.g., R1) into the packet in place of the router ID (e.g., R6) that already appears in the packet. In some examples, the spoofed packet 116 may also include a spoofed router ID for router 113 (R6). In other examples, the spoofed packet 116 may not include a router ID for the purported source AS egress router.

In one example, the first AS 100 further includes a threat intelligence system 126. The threat intelligence system 126 may analyze traffic information and identify threats to AS 100. In examples, the traffic information includes both router identifier information (e.g., a router identifier or information from which the router identifier can be derived), and an identification of the source of the traffic. The traffic information may be obtained, for example, from the various servers 110 and/or routers 106 of the first AS 100. In one example, the threat intelligence system 126 is configured to sample, at a given rate (e.g., one out of 100), packets received by the servers 110 and/or routers 106 to identify threats. The threat intelligence system 106 may compare the router identifier information from the sampled packets to expected ingress router information. For example, during a particular sampling, the threat intelligence system 126 may compare the ingress router ID inserted into the packet 108', 116' against an expected router ID, and determine whether there is a mismatch of the router IDs. In a simple example, the threat intelligence system 126 may determine, for a sampled packet: (a) the purported source IP address and/or source AS; (b) the first router ID that was inserted into the packet after ingress into AS 100 (e.g., 122, 124); and (c) the expected ingress router ID for the source IP address and/or source AS. In some examples, the expected ingress router information may comprise the most-likely router ID for the source IP address and/or source AS (e.g., based on historical data). For example, a single, most-likely ingress router ID may be determined as the expected ingress router information, and whenever there is a mismatch between the expected ingress router ID and the ingress router ID in the sampled packet, a threat measure for the particular source IP address and/or source AS may be incremented. In some examples, the threat measure may also be decremented when a certain period has passed with no mismatches or whenever there is a match between the expected ingress router ID and the ingress router ID in the sampled packet. The current value of the threat measure for that particular source IP address and/or source AS may then be used as a factor in determining whether a threat has been detected or a threat condition currently exists.

In other examples, the expected ingress router information may comprise multiple expected ingress router IDs for the source IP address and/or source AS, and a "match" or "mismatch" may be more holistically determined. For example, if load for traffic from the AS 102 into the AS 100 is typically split between multiple ingress router(s) (e.g., router R1 106*a* and router R3 106*c*), then the comparison of actual and expected router IDs may be done based on statistics over a period of time (rather than a determining whether a particular ingress router ID in a single packet matches an expected ingress router ID).

As discussed, the expected ingress router information may depend on historical data. For example, the threat intelligence system 126 may keep a running statistic of router IDs for ingress routers of AS 100 that receive packets from different AS's (such as AS 102). For example, if historically 80% of the traffic from the second AS 102 is received on R1 106*a* while 20% of the traffic is received on R3 106*c*, the distribution of ingress router IDs detected in sampled packets may be expected to be similar over a period of time. When the threat intelligence system 126 detects a sudden change in the distribution of incoming traffic to ingress routers, or an increase of data packets purportedly from the second AS 102 that are received by a different router ID entirely (e.g., the router ID for R5 106*e*), the threat intelligence system 126 may determine that a threat profile has been satisfied. In examples where a single, most-likely ingress router is used as the expected ingress router distribution (e.g., R1 106*a*), the threat measure may be incremented whenever a packet from AS 102 is received by a router other than R1 106*a*. However, the threat profile may be set such that it is only satisfied if it exceeds more than, e.g., 25 of the last 100 samples, since it is expected based on historical trends that 20% of the traffic would be received by R3 106*c*. In examples where the expected ingress router distribution comprises multiple routers (e.g., in a particular ratio), the threat profile may be set such that it is satisfied if the percentage of traffic historically received by either or both of R1 106*a* and/or R3 106*c* varies by more than X %. The threat profile may also be satisfied based on consideration of other factors, such as when the total traffic directed to a particular server (e.g., server S2 110*b*) has risen by X % in the last Y minutes, and/or the like.

In examples, the threat intelligence system 126 may store or have access to other routing information relevant to determining the expected distribution of router ID(s) for a purported source IP address or source AS. For example, the other routing information may include known peering relationships between AS 100 and AS 102 (e.g., designated ingress routers R1 106*a* and R3 106*c* dedicated to AS 102), a known set of source IP addresses assigned to AS 102 (so that a source AS can be determined from the purported source IP address of the packet), known load-balancing information (e.g., whether a load-balancing server has recently added router R5 106*e* to the AS 100/AS 102 peering relationship, so an increase in traffic to R5 106*e* from AS 102 is not suspicious), etc.

In examples, when a threat is detected, the threat intelligence system may cause mitigation actions to be taken (e.g., when a threat measure exceeds a particular threshold or traffic purportedly from a particular purported source IP address or source AS deviates from an expected ingress router distribution by more than a threshold amount over a measurement period). Mitigation actions may comprise instituting filters, on-demand scrubbers, or other rules or components to mitigate effects of the identified threat(s). In this regard, the threat intelligence system 126 may signal the routers 106 and/or servers 110 to take a threat mitigation step to attempt to combat the attack. As a non-exclusive example, a filter may be implemented on router R5 106*e* to drop any packets received with source IP address 118. In other examples, the routers 106 may be instructed (e.g., by threat intelligence system 126 or another component) to direct all traffic from source IP address 118 and/or AS 102 to one or more scrubbing centers or other scrubbing appliances in order to apply filtering rules or further analyze traffic while a threat (or potential threat) is detected. Once a threat has been identified, threat mitigation for an identified threat may be applied at or by the routers 106 and/or by other devices within AS 100 (or outside of AS 100).

Figure 2:
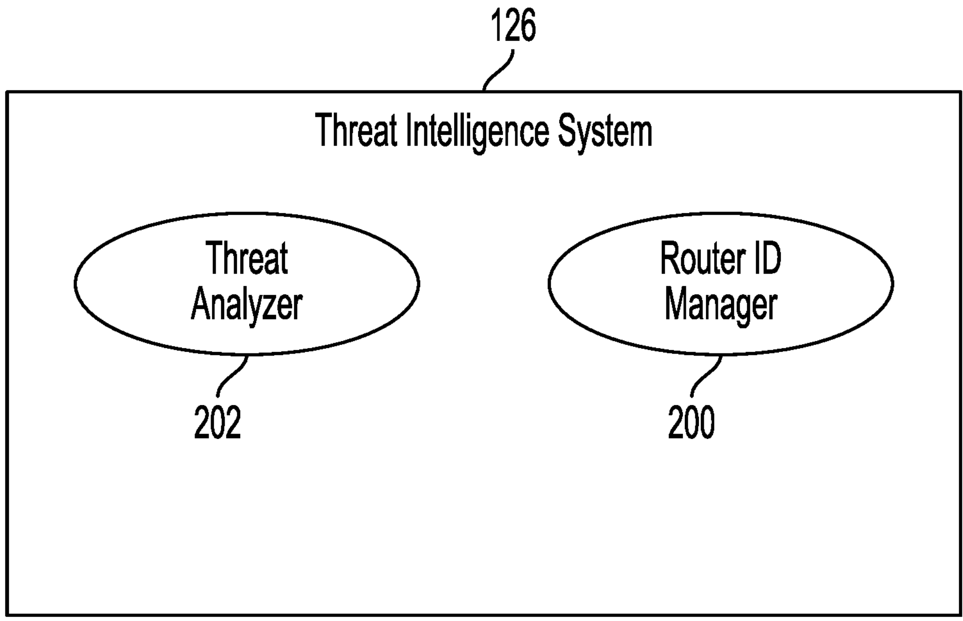
FIG. 2 is a block diagram of a threat intelligence system for mitigating DoS attacks according to examples.

FIG. 2 is a block diagram of the threat intelligence system 126 for mitigating DoS attacks according to one example. The second AS 102 may include a similar threat intelligence system (not shown) for invoking threat mitigation services for the second AS.

In one example, the threat intelligence system 126 includes a router ID manager 200 and a threat analyzer 202. Although the router ID manager 200 and the threat analyzer 202 are depicted in FIG. 2 as separate components, a person of skill in the art should recognize that these components 200, 202 may be combined into a single component, or one or more of the components may be further subdivided into additional sub-components as will be appreciated by a person of skill in the art.

The router ID manager 200 and the threat analyzer 202 may be hosted in a single device or distributed over multiple devices. For example, the router ID manager 200 and/or the threat analyzer 202 may be hosted in one or more routers 106, servers 110, or other equipment of the first AS 100. In some examples, the services of the router ID manager 200 and/or threat analyzer 202 may be provided by a third party.

In one example, the router ID manager 200 is configured to assign unique router IDs to the routers 106 in the first AS 100. The router ID manager 200 may store the router IDs in a mapping table in association with other identifiers for routers 106, such as router IP address(es), MAC address(es), etc.

In some examples, the router IDs are internally generated by the routers 106 themselves and transmitted to the router ID manager 200 for populating the mapping table. The routers 106 may transmit their router IDs in response to a query by, for example, the router ID manager 200 when the routers are first connected to the AS 100. A query mechanism such the Internet Control Message Protocol version 6 (ICMPv6) may be used for querying the routers for their router IDs. The routers 106 transmit other information such as, for example, timestamp of the router IDs or other router ID expiration information.

The router IDs may be numeric values. Initial router IDs may be assigned (e.g., randomly) when the routers 106 are first provisioned and configured on AS 100. Router IDs may also be assigned based on a router characteristic, such as, for example, the geographic region where the router is located. For example, a first block of router IDs may be reserved for routers in a first geographic region, and a second block of router IDs may be reserved for routers in a second geographic region. A router in the first geographic region may then be assigned a router ID from the first block of IDs, and a router in the second geographic region may be assigned a router ID from the second block of IDs.

In one example, the router IDs assigned to the routers expire after a certain amount of time, or when some other expiration criterion is satisfied. In one example, a timestamp indicating when the router ID was assigned is stored in the mapping table along with the router IDs. In one example, the router ID manager 200 periodically checks the mapping table for determining whether any router ID has expired. The router ID manager 200 assigns (or sends a message to cause assignment of) a new/different router ID for the router 106 upon expiration. In examples, changing router IDs may assist in preventing a bad actor from also spoofing an ingress router ID packets received by AS 100.

In one example, the threat analyzer 202 is configured to collect traffic information (e.g., from the servers 110 and/or router(s) 106) and analyze it for indications of malicious traffic. The traffic information may include both information about the traffic and the router ID of the router at the ingress point receiving the traffic. In one example, the threat analyzer samples the data packets at a given rate for analyzing the packets for threats. For example, if a packet is selected for analysis, the threat analyzer retrieves, from the packet, the router ID of the ingress router receiving the packet. The threat analyzer 202 may determine whether the router ID of the ingress router matches the expected ingress router information (e.g., the router ID of the router that is, e.g., from a historical/statistical perspective, expected to receive the traffic given the source IP address). A threat count/measure may be increased in the event of a mismatch.

In one example, the threat measures may be compared to one or more thresholds to determine certain actions to be taken. Thresholds may be time-based. For example, a threshold may comprise a certain number of packets meeting a threshold within a preset window of time (e.g., the past X minutes). If the threat count exceeds an applicable threshold, the threat count can be used to cause one or more mitigation actions to be taken. In other examples, a threat determination is based on statistically comparing an expected distribution of ingress routers for a particular source IP address or source AS to the detected distribution from sampled packets, e.g., over a period of time.

Mitigation actions may comprise instituting filters, on-demand scrubbers, routing to separate scrubbing centers, or other rules or components to mitigate effects of the identified threat(s). For example, the threat analyzer 202 may signal appropriate routers (e.g., router R5 106*e*), scrubbers, or filtering systems to apply one or more mitigation rules. One example of a mitigation rule may be to filter or ignore/drop any data packets that fit the criteria defined by the mitigation rule (e.g., drop packets with a particular source IP address or a source IP address associated with the second AS 102). In other examples, mitigation rules may cause delayed responses to client queries (without dropping the messages entirely). Mitigation actions can be implemented for a preset period of time, until the condition causing the mitigation action to be taken has been remedied, or until an administrator of threat intelligence system 126 determines the threat mitigation action is no longer necessary, among other options.

Figure 3A:
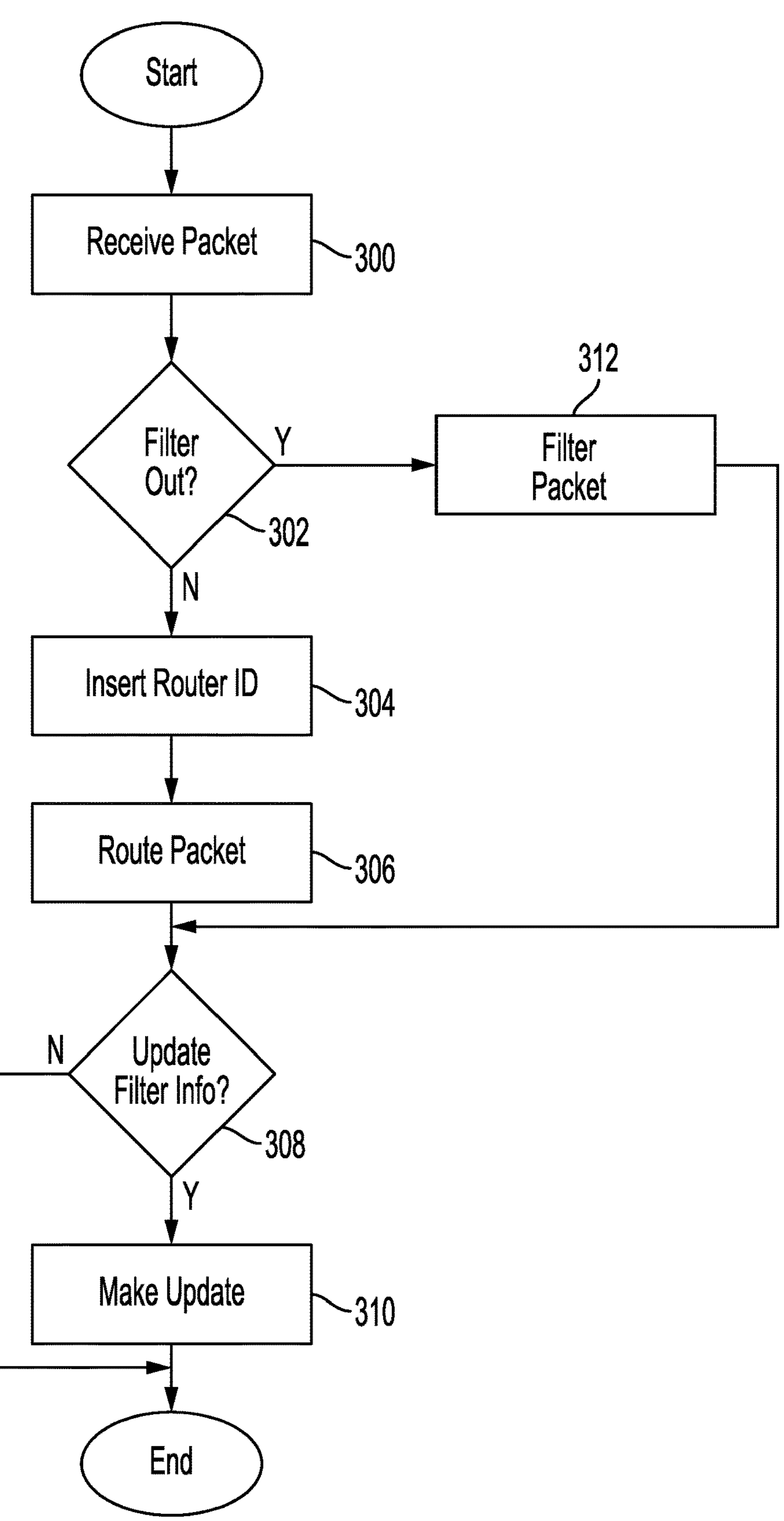
FIG. 3A is a flow diagram of a process for processing data packets according to examples.

FIG. 3A is a flow diagram of a process. In examples, the process of FIG. 3A may be implemented by one of the routers 106 of the first AS 100 for processing data packets according to one example. In other examples, the process of FIG. 3A may be implemented by one or more routers 106 in combination with one or more separate threat mitigation devices or services. The process starts, and in act 300, traffic (e.g., packet 116 or 108) is received, for example, by one of the routers (e.g., router R5 106*e* or router R1 106*a*). The data packet may have, as a purported source IP address, the IP address of a network component (e.g., S3 112) in the second AS 102.

In act 302, a determination is made as to whether the received packet is to be filtered or routed according to the destination IP address. The determination may be based, for example, on rules in a routing table used by the receiving router. If there is no threat, or the threat has not yet been detected by the threat intelligence system 126, the routing table may not include a rule to filter out the data packet and/or redirect it to a scrubbing center or other threat mitigation device or service. In this case, the receiving router inserts, in act 304, its uniquely assigned router ID into a preset field of the data packet. For example, the preset field may be an "options" field in a header of an IPv4 data packet.

In act 306, the data packet is routed to the destination address. For example, the packet may be routed to server 110*b* within AS 100.

In act 308, a determination is made as to whether updates are needed to any filtering information used by the one or more routers. Updates may be needed, for example, in response to a threat determination by the threat intelligence system 126. As discussed, the threat determination may be statistically derived based on monitored traffic of the first AS 100, may be based on known peering relationships or load-balancing information, among other possibilities. For example, the threat intelligence system 126 may determine, based on the monitored traffic, that data packets from a particular IP source address (e.g., IP address 1.2.3.4), and/or particular AS (e.g., the second AS 102), are malicious. In response to the threat determination, the threat intelligence system 126 may send a signal to one or more routers of the first AS 100 (e.g., router R5 106*e*), to update, for example, their routing table with a filtering rule that filters out packets from the particular IP source address and/or particular AS. In other examples, the routing tables may be updated to direct traffic from the particular IP source address and/or particular AS to one or more scrubbing centers and/or other threat mitigation devices or services.

In act 310, the router receiving the signal performs updates, for example, of its routing table, with the filtering rule.

Referring again to act 302, if a determination is made, per an existing filtering rule, that the packet received in act 300 is to be filtered, the packet may be filtered or ignored in act 312. In other examples, packet from the particular IP source address and/or particular AS may be redirected to one or more scrubbing centers and/or other threat mitigation devices or services. The filtering may be done, for example, by a filter, scrubber, and/or the like, instituted on the router, or another device of AS 100, or a separate scrubbing center communicatively coupled to the AS 100.

Over time, the threat may change (e.g., increase or decrease). For example, if a threat measure decreases below a particular threshold, it may no longer be necessary to filter packets per an existing filtering rule. In other examples, a filtering rule may be altered in accordance with an increased threat (e.g., packets that were being redirected due to an initial filtering rule, may be dropped at the router in response to detection of an increased threat). Thus, in act 308, a determination is made as to whether the filtering information used by a router should be updated (e.g., by removing or modifying an existing filtering rule). If the answer is YES, the update is made in act 310.

Figure 3B:
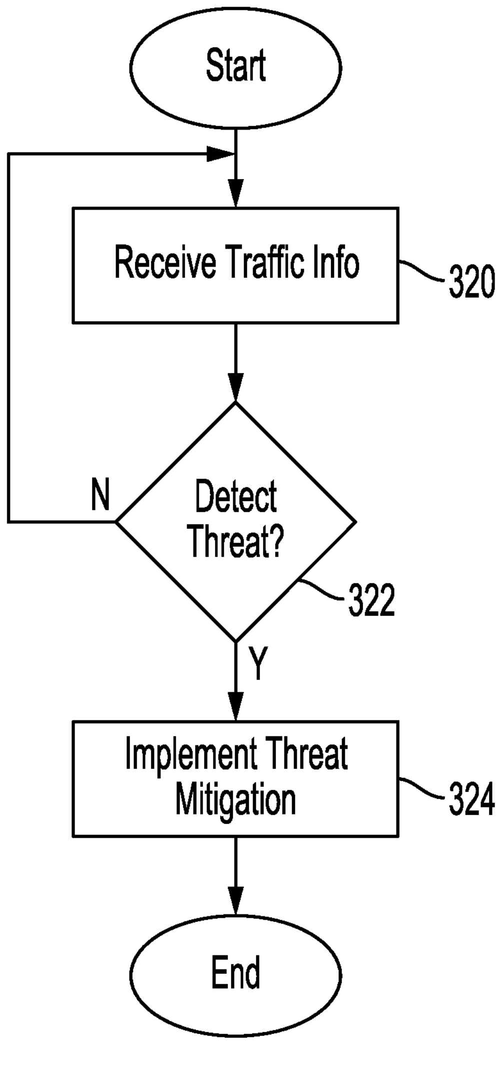
FIG. 3B is flow diagram of a process for making a threat determination according to examples.

FIG. 3B is flow diagram of a process for making a threat determination according to one example. The process starts, and in act 320, traffic information of incoming packets is received by, for example, the threat intelligence system 126. For example, traffic information may be collected according to the NetFlow protocol, or otherwise. Traffic information may include, for example, source IP address, destination IP address, transmitting AS number, ingress router ID, timestamps, and/or the like. The traffic information may be obtained, for example, from the various servers 110 and/or routers 106 of the first AS 100.

In act 322, a determination is made as to whether a threat is identified based on the received traffic information. In this regard, the threat intelligence system 126 may be configured to sample the traffic information at a given rate (e.g., sample one data packet out of 100 received packets) for determining potential threats.

In one example, the threat determination includes comparing a router ID inserted by a router at an entry point of the first AS 100 receiving the data packet, against an expected ingress router ID. Each inserted router ID may be retrieved from the header of the data packet along with, for example, a timestamp indicative of when the router ID was inserted. In examples, the timestamp may be used to consider as a group router IDs of a single router whose router ID may have been changed during the period of evaluation. The expected ingress router ID(s) may be determined, for example, based on historical data, as described.

In some examples, the ingress router ID inserted into each packet purportedly from the second AS may be evaluated to determine if it matches the expected ingress router ID for that second AS. If not, a threat measure may be incremented. In other examples, the expected ingress router ID(s) for traffic from the second AS may be evaluated statistically (e.g., the ingress router ID(s) should, over a set period of time, be distributed in a predictable manner). For example, if historically 80% of the traffic from the second AS 102 is received on R1 106*a* and 20% of the traffic from the second AS 102 is received on R3 106*c*, the expected router ID distribution for traffic from the second AS may be similar. Other expected distributions of router ID(s) for traffic from a particular AS are possible and contemplated, including consideration of defined peering arrangements, load-balancing information, etc.

In one example, a threat may be detected if the threat intelligence system 126 detects a mismatch between the inserted router ID(s) and the expected router ID(s), e.g., within a given time period. For example, the threat intelligence system 126 may identify that there is a threat when a threat measure has been incremented above a certain threshold, or when a certain percentage of sampled packets in the last X minutes/hours result in a mismatch to the most-likely ingress router ID, or when the actual distribution of router IDs from the sampled packets is different from the expected distribution of router IDs by at least a threshold amount (e.g., a threshold percentage) within a given time period. In examples, the comparison of router identifier information from sampled packets versus expected ingress router information may be used as a non-exclusive factor, along with other information, in determining whether a threat condition exists. For example, third-party threat evaluations associated with a particular source IP address, an unusual increase in volume of traffic to a particular destination IP address, and other information may be used in making a threat determination.

In some examples, a mismatch between detected and expected ingress router IDs may be due to the router ID of the expected router(s) being assigned a new router ID upon expiration of a prior router ID. If the expected router(s) ID(s) has/have expired, and the mapping table has not yet been updated, a query (e.g., using the ICMPv6 query mechanism) may be transmitted to the expected router(s) for obtaining the updated router ID(s). The detected and expected router IDs may then be re-evaluated with consideration of the updated router ID(s).

Assuming that the router IDs have been updated, if a threat is detected from the gathered statistics, a threat mitigation action may be invoked in act 324. The threat mitigation action may include, for example, transmitting a signal to one or more routers to add filtering rules to filter out and/or redirect packets with a particular source IP address, AR number, and/or the like. Other mitigation actions may include delaying responses to client queries without dropping the messages entirely.

Figure 4:
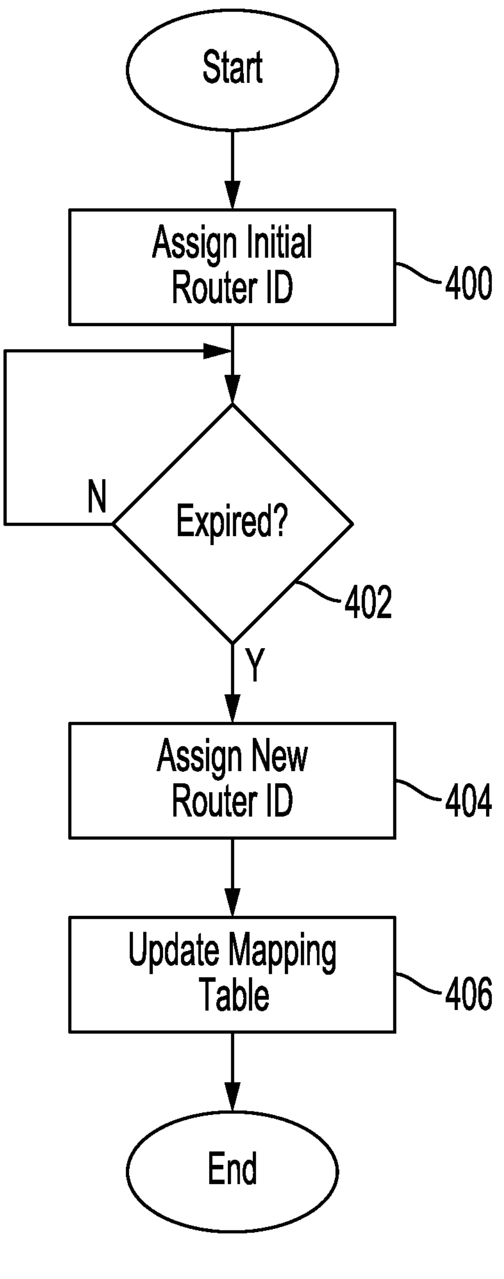
FIG. 4 is a flow diagram of a process for assigning and reassigning a router ID according to examples.

FIG. 4 is a flow diagram of a process for assigning and reassigning a router ID according to one example. The process starts, and in act 400, an initial router ID is assigned to one of the routers 106. In examples, the router ID may be assigned by the router ID manager 200 or generated by the router itself. In one example, the router ID is selected randomly. In one example, the router ID is selected from a group of router IDs reserved for routers in a particular geographic area. Regardless of the selection mechanism, the selected router ID may be unique to the router, at least within the router's AS.

In one example, the router ID is stored in a mapping table maintained by the router ID manager 200. The router ID may be stored with timestamp information that may be used to determine whether the router ID has expired.

In act 402, a determination is made as to whether the router ID has expired. In this regard, an assigned router ID may be configured to expire after a certain amount of time has passed since the last assignment for the router 106. This may help reduce the possibility of an attacker determining the router ID of a particular router, and pre-pending the router ID to packets during a DoS attack.

If the router ID has expired, a new router ID is assigned to the router 106 in act 404. The new router ID may be one that is different from one or more previous router IDs of the router.

In examples, the mapping table maintained by the router ID manager 200 is updated, in act 406, with the new router ID and timestamp of the new ID. In examples, the updated mapping table of router IDs may be provided and/or made available to a threat intelligence system 126. In combination with the timestamp of when an ingress router ID was inserted into a packet and a timestamp of the effective time for the new router ID, the threat intelligence system 126 can determine the expected router ID(s) or router ID distribution for a particular source IP address and/or source AS, as described herein.

Figure 5:
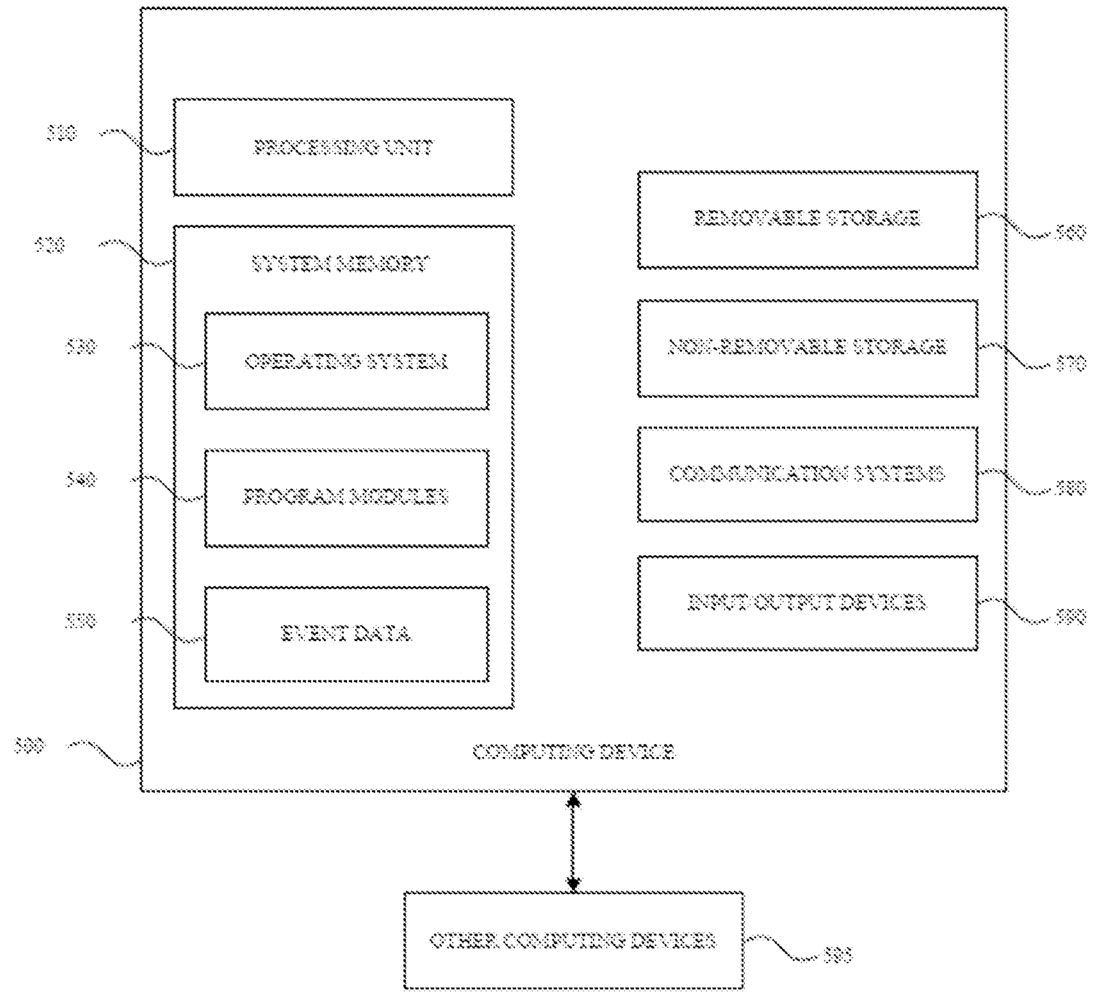
FIG. 5 is a block diagram of a computing device according to examples.

FIG. 5 is a block diagram of a computing device 500 according to an example. The computing device 500, or various components and systems of the computing device 500, may be integrated or associated with the routers 106, 113, servers 110, 112, and threat intelligence system 126. As shown in FIG. 5, the physical components (e.g., hardware) of the computing device are illustrated and these physical components may be used to practice the various aspects of the present disclosure.

The computing device 500 may include at least one processing unit 510 and a system memory 520. The system memory 520 may include, but is not limited to, volatile storage (e.g., random access memory), non-volatile storage (e.g., read-only memory), flash memory, or any combination of such memories. The system memory 520 may also include an operating system 530 that controls the operation of the computing device 500 and one or more program modules 540. The program modules 540 may be responsible for gathering or determining event data 550 including endpoint data and/or network data. A number of different program modules and data files may be stored in the system memory 520. While executing on the processing unit 510, the program modules 540 may perform the various processes described above.

The computing device 500 may also have additional features or functionality. For example, the computing device 500 may include additional data storage devices (e.g., removable and/or non-removable storage devices) such as, for example, magnetic disks, optical disks, or tape. These additional storage devices are labeled as a removable storage 560 and a non-removable storage 570.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 5 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 500 on the single integrated circuit (chip). The disclosure may also be practiced using other technologies capable of performing logical operations such as, for example, AND, OR, and NOT, including but not limited to mechanical, optical, fluidic, and quantum technologies.

The computing device 500 may include one or more communication systems 580 that enable the computing device 500 to communicate with other computing devices 595 such as, for example, servers, routers, network devices, client computing devices, etc. Examples of communication systems 580 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 500 may also have one or more input devices and/or one or more output devices shown as input/output devices 590. These input/output devices 590 may include a keyboard, a sound or voice input device, haptic devices, a touch, force and/or swipe input device, a display, speakers, etc. The aforementioned devices are examples and others may be used.

The term computer-readable media as used herein may include non-transitory computer storage media. Computer storage media may include volatile and nonvolatile, removable and non-removable media implemented in any method or technology for storage of information, such as computer readable instructions, data structures, or program modules.

The system memory 520, the removable storage 560, and the non-removable storage 570 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media is non-transitory and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular examples only and is not intended to be limiting of the inventive concept. Also, unless explicitly stated, the examples described herein are not mutually exclusive. Aspects of the examples described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing examples of the inventive concept refers to "one or more examples of the present disclosure." Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for mitigating DoS attacks have been specifically described and illustrated herein, many modifications and variations will be apparent to those skilled in the art. Accordingly, it is to be understood that the systems and methods for mitigating DoS attacks constructed according to principles of this disclosure may be embodied other than as specifically described herein. The disclosure is also defined in the following claims, and equivalents thereof.

What is claimed is:

1. A method comprising:

receiving traffic information for a first autonomous system, wherein the traffic information includes:

router identifier information identifying at least one ingress router receiving traffic at the first autonomous system; and identification of a source of the traffic;

determining whether the router identifier information matches expected ingress router information for the source of the traffic; and causing, based at least in part on determining that the router identifier information does not match the expected ingress router information for the source of the traffic, a threat mitigation action to be invoked, wherein determining whether the router identifier information matches the expected ingress router information further comprises:

extracting the router identifier information from a plurality of sampled packets received by the first autonomous system;

determining, from the router identifier information, a distribution of ingress routers for the traffic during a period of time; and determining an expected distribution of ingress routers during the period of time based on historical data.

2. The method of claim 1, wherein the identification of the source of the traffic is a source IP address in each of the sampled packets.

3. The method of claim 1, where the identification of the source of the traffic is an autonomous-system identifier for a second autonomous system.

4. The method of claim 1, wherein determining whether the router identifier information matches the expected ingress router information further comprises:
incrementing a threat measure when the router identifier information for any packet of the plurality of packets does not match the expected distribution of ingress routers; and
determining whether the threat measure exceeds a threshold.

5. The method of claim 1, wherein determining whether the router identifier information matches the expected ingress router information further comprises:
determining whether the distribution of ingress routers for the traffic during the period of time differs from the expected distribution of ingress routers during the period of time by at least a threshold amount.

6. The method of claim 1, further comprising:
causing the router identifier information for the at least one ingress router to be changed periodically to new router identifier information; and
updating a router mapping table with the new router identifier information.

7. The method of claim 6, wherein the new router identifier information includes an expiration time, wherein the expected ingress router information is determined from the router mapping table, and the router identifier information includes a timestamp indicating when the at least one ingress router received the traffic at the first autonomous system.

8. The method of claim 6, wherein the router identifier information comprises a router identifier that is different from either an Internet protocol (IP) address or media access control address.

9. A system comprising:
at least one processor; and
memory, operatively connected to the at least one processor and storing instructions that, when executed by the at least one processor, cause the system to perform a method, the method comprising:
receiving traffic information for a first autonomous system, wherein the traffic information includes:
router identifier information identifying at least one ingress router receiving traffic at the first autonomous system; and
identification of a source of the traffic;
determining whether the router identifier information matches expected ingress router information for the source of the traffic; and
causing, based at least in part on determining that the router identifier information does not match the expected ingress router information for the source of the traffic, a threat mitigation action to be invoked,
wherein determining whether the router identifier information matches the expected ingress router information further comprises:
extracting the router identifier information from a plurality of sampled packets received by the first autonomous system;
determining, from the router identifier information, a distribution of ingress routers for the traffic during a period of time; and
determining an expected distribution of ingress routers during the period of time based on historical data.

10. The system of claim 9, wherein the identification of the source of the traffic is a source IP address in each of the sampled packets.

11. The system of claim 9, where the identification of the source of the traffic is an autonomous-system identifier for a second autonomous system.

12. The system of claim 9, wherein determining whether the router identifier information matches the expected ingress router information further comprises:
incrementing a threat measure when the router identifier information for any packet of the plurality of packets does not match the expected distribution of ingress routers; and
determining whether the threat measure exceeds a threshold.

13. The system of claim 9, wherein determining whether the router identifier information matches the expected ingress router information further comprises:
determining whether the distribution of ingress routers for the traffic during the period of time differs from the expected distribution of ingress routers during the period of time by at least a threshold amount.

14. The system of claim 9, wherein the method further comprises:
causing the router identifier information for the at least one ingress router to be changed periodically to new router identifier information; and
updating a router mapping table with the new router identifier information.

15. The system of claim 14, wherein the new router identifier information includes an expiration time, wherein the expected ingress router information is determined from the router mapping table, and the router identifier information includes a timestamp indicating when the at least one ingress router received the traffic at the first autonomous system.

16. The system of claim 14, wherein the router identifier information comprises a router identifier that is different from either an Internet protocol (IP) address or media access control address.

* * * * *